United States Patent [19]

Strickland

[11] Patent Number: 5,152,094

[45] Date of Patent: Oct. 6, 1992

[54] FISHING SINKER APPARATUS

[76] Inventor: Richard C. Strickland, P.O. Box 1136, LaBelle, Fla. 33935

[21] Appl. No.: 817,470

[22] Filed: Jan. 3, 1992

[51] Int. Cl.⁵ .............................................. A01K 85/00
[52] U.S. Cl. .................................. 43/42.24; 43/42.36; 43/42.39
[58] Field of Search ................ 43/42.24, 42.36, 42.39, 43/44.9, 44.91, 44.2, 42.29

[56] References Cited

U.S. PATENT DOCUMENTS

| | | | |
|---|---|---|---|
| 3,854,233 | 12/1974 | Browning, III | 43/42.29 |
| 3,978,606 | 9/1976 | Riggs | 43/42.24 |
| 4,094,087 | 6/1978 | Carpenter | 43/42.24 |
| 4,167,076 | 9/1976 | Weaver | 43/42.29 |
| 4,244,133 | 1/1981 | Martinek | 43/42.25 |
| 4,649,663 | 3/1987 | Strickland | 43/44.9 |
| 4,653,212 | 3/1987 | Pixton | 43/42.24 |
| 5,025,586 | 6/1991 | Pixton | 43/42.24 |

*Primary Examiner*—Richard K. Seidel
*Assistant Examiner*—Jeanne M. Elpel
*Attorney, Agent, or Firm*—William E. Noonan

[57] ABSTRACT

A fishing sinker apparatus is provided for a Texas rig-type fishing lure assembly. The apparatus includes a convexly tapered weight member having a relatively pointed leading portion, a relatively broad trailing portion and an axial portion that extends through the weight member from the leading portion to the trailing portion. A helical element is attached to the trailing portion of the weight member and extends axially a relatively short distance therefrom for provisionally screwing the weight member to the lure. A tubular element is mounted in the axial opening and includes a collapsible segment that extends from the trailing portion and through the helical element for slidably receiving a fishing line and protecting the fishing line from the helical element. The helical element has an inner end that is spaced apart from the tubular element and further has a substantially uniform diameter that is sufficiently large and a length that is sufficiently short such that the hook of the Texas rig may be pulled within the helical element to collapse the collapsible segment of the tubular element and release the weight member from the lure. In this fashion the sinker is converted from a fixed sinker to a slip sinker.

8 Claims, 2 Drawing Sheets

FISHING SINKER APPARATUS

FIELD OF THE INVENTION

This invention relates to an improved fishing sinker and, more particularly, to a weighted sinker for a Texas rig style lure of the type primarily used in bass fishing.

BACKGROUND OF THE INVENTION

"Texas rig" type lures are extremely popular fishing equipment, particularly among bass fisherman. In the conventional Texas rig, a fishing hook, with a line attached thereto, is embedded in a plastic worm such that the eyelet of the hook is located toward the head and the point of the hook is located toward the tail of the worm. A lead weight sinker is used to assist in casting the hook and lure and in dropping these items toward the bottom of the water being fished. The fisherman then attracts the fish by flipping, jigging, reeling in or otherwise moving the line so that the plastic worm simulates the movement of a live worm.

Texas rigs have employed both slip and fixed sinkers. A slip sinker typically includes a groove or channel that permits it to slide along the line, whereas a fixed sinker is fixedly attached to the lure or line. Unfortunately, most known slip and fixed sinkers have exhibited a number of disadvantages. Traditional slip sinkers tend to fray the fishing line, although this problem has been remedied by the use the tubular plastic insert disclosed in my U.S. Pat. No. 4,649,663, issued Mar. 17, 1987. In addition, slip sinkers are often ineffective for fishing through water covered by debris, such as weeds and water lilies. After it is cast, the fishing hook may become caught on such surface material and left behind as the sinker descends to the bottom.

Generally bullet-shaped fixed sinkers have been developed to reliably carry the lure to the bottom. Recently, such sinkers have been provided with coil springs and other means for securing them to the head of the plastic worm. In one known apparatus, described in U.S. Pat. No. 5,025,586, a helical coil spring having a relatively narrow diameter extends axially from the sinker weight for screwing the weight onto the worm. A rigid plastic tube, which receives the fishing line, extends axially through the weight and through the spring to a location near the eyelet of the hook embedded in the worm. As a result, this device effectively secures the weight to the plastic worm. However, it often hinders proper setting of the hook. Following an apparent strike, when the fisherman pulls on the line to set the hook into the fish, the rigid insert and/or the spring tends to restrict the movement of the eyelet portion of the hook. As a result, the pointed portion of the hook may be unable to pierce fully through the worm and set in the fish. Moreover, this sinker does not dislodge or release from the worm after a fish strikes. Rather, its spring coil is screwed a considerable distance (at least eight turns) into the worm and the inner end of the spring is directly attached to the insert so that the spring has a conical shape. As a result, the sinker remains lodged in the worm even after the fish strikes and this may cause the line to which this sinker is attached to break as the fish is reeled in by the fisherman. In addition, such fixed sinkers do not provide nearly as satisfactory a feel as is provided by slip sinkers.

SUMMARY OF INVENTION

It is therefore an object of this invention to provide an improved fishing sinker apparatus for Texas rig-type fishing lure that incorporates the advantages but reduces the problems exhibited by conventional fixed and slip sinkers.

It is a further object of this invention to provide a fishing sinker apparatus for a Texas rig that permits the fish hook to be effectively and securely set in a fish without hinderance from the sinker apparatus itself.

It is a further object of this invention to provide a fishing sinker apparatus that remains securely attached to a Texas rig-type lure before a fish strikes and the hook is set so that the lure is reliably sunk through vegetation and debris to the bottom of the body of water being fished.

It is a further object of this invention to provide a fishing sinker apparatus that readily and completely releases from a Texas rig-type lure after a fish strikes and the hook is set to thereafter serve as a slip sinker.

It is a further object of this invention to provide a fishing sinker apparatus that reduces breakage of the fishing line and provides a favorable feel for the fisherman.

This invention results from a realization that when a Texas rig-type lure employs a sinker that is attached to the head of the lure by a helical coil wound about a tubular element, improved setting of the hook may be accomplished if the eyelet of the hook can be pulled within the helical coil. Accordingly, the helical spring must have a sufficient diameter to accommodate the eyelet and the tubular element must be collapsible so as not to block or restrict movement of the eyelet of the hook. This invention results from a further realization that before a fish strikes the lure, the sinker should be fixed, but following such a strike and the setting of the hook a slip sinker is more desireable. Accordingly, this invention employs a sinker apparatus that is releasably attached to the lure and is constructed to readily dislodge from the lure when a fish strikes and the hook is set.

This invention features a fishing sinker apparatus for a Texas rig-type fishing lure, wherein an eyelet portion of a hook attached at one end of the fishing line is embedded in the lure relatively toward a head of the lure and a pointed portion of the hook is embedded in the lure relatively toward a tail portion of the lure. The sinker apparatus includes a convexly tapered weight member having a relatively pointed leading portion and a relatively broad trailing portion. An axial opening extends through the weight member from the leading portion to the trailing portion. A helical element is attached to the trailing portion of the weight member and extends axially a relatively short distance therefrom for provisionally screwing the weight member to the lure. A tubular element is mounted in the axial opening. That tubular element includes a collapsible segment that extends from the trailing portion and through the helical element for slidably receiving the fishing line and protecting the fishing line from the helical element. The helical element has an inner end that is spaced apart from the tubular element and further has a substantially uniform diameter that is sufficiently large and a length that is sufficiently short such that the eyelet portion of the hook may be pulled within the helical element to collapse the collapsible segment of the tubular element and release the weight member from the lure. This allows the hook to properly set in a fish that has struck the lure. It also converts the sinker into a slip sinker.

In a preferred embodiment, the helical element and the collapsible segment of the tube extend generally equal distances beyond the trailing portion of the weight member. Typically, the helical element is wound no more than three and a half turns from the trailing portion and extends no more than ¼" therefrom. As a result, the sinker is readily released from the lure when the eyelet of the hook is pulled within the helical element and the hook is set.

DETAILED DESCRIPTION OF PREFERRED EMBODIMENTS

Other objects, features and advantages will occur from the following description of a preferred embodiment and the accompanying drawings in which.

Figure 1:
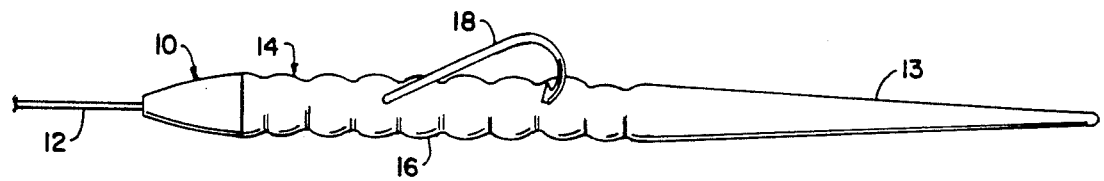
FIG. 1 is an elevational view of a Texas rig-type lure having the sinker apparatus of this invention attached to the head thereof.
Figure 2:
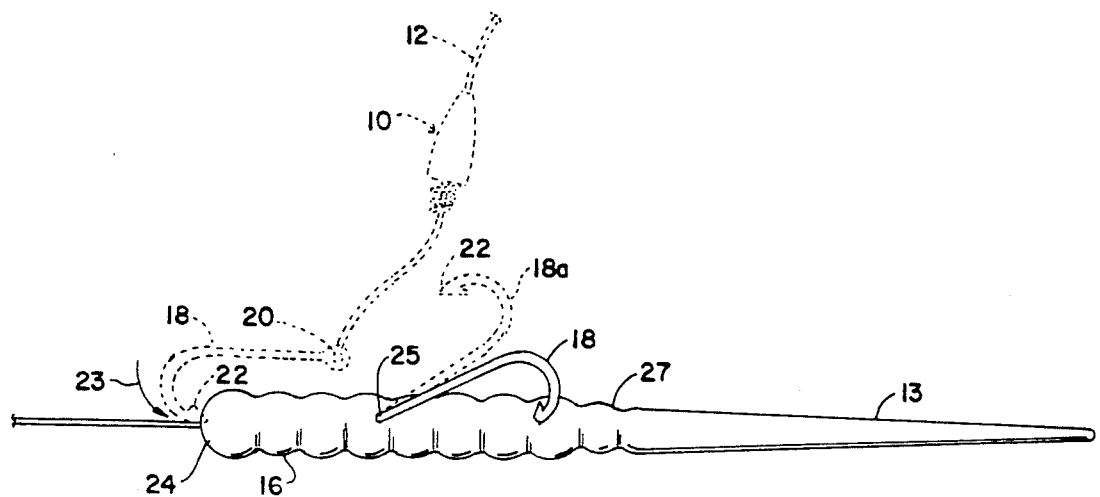
FIG. 2 is an elevational view similar to FIG. 1 that illustrates a preferred manner for assembling the Texas rig such that the sinker of this invention may be attached to the lure.

There is shown in FIG. 1 a sinker apparatus 10 that is slidably mounted on a fishing line 12 and attached to a conventional Texas rig-type lure assembly 14. The Texas rig assembly comprises a rubber or plastic worm 16 through which a fish hook 18 is embedded according to the known "Texas rig" technique. As best shown in FIG. 2, hook 18 includes an eyelet 20 at one end, a barbed point 22 at the opposite end and an intermediate shaft 19. Fishing line 12 is tied to or otherwise secured to the hook through eyelet 20 and sinker 10 is slidably mounted along line 12 in a manner described more fully below.

To assemble the Texas rig, point 22 of hook 18 is embedded in the direction of arrow 23 into head portion 24 of worm 16. Hook 18 is then manipulated through the body of worm 16 and extended out of the body through an opening 25 created by the point 22 to the position shown by 18a. Point 22 is then embedded in the body portion 27 of worm 16 relatively toward the tail portion 13 of the worm. This protects the point from entangling with underwater plants. In clear open water conditions point 22 may be extended completely through the body of worm 16. In these cases, the remainder of the hook remains fully embedded in the worm and the hook is not exited through an opening 25. In either event, eyelet portion 20 remains embedded within the worm relatively toward head portion 24. After the hook has been secured to the worm in this manner, sinker 10 is drawn along line 12 and provisionally attached to head portion 24, as illustrated in FIG. 1 and described more fully below.

Figure 3:
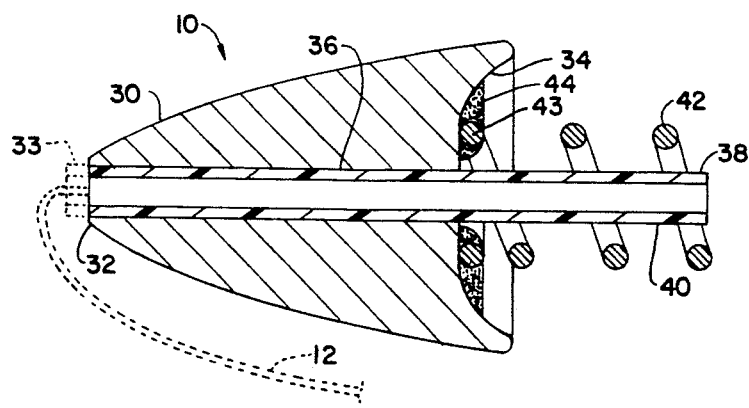
FIG. 3 is an elevational, cross-sectional view of a preferred sinker according to this invention.

As best shown in FIG. 3, sinker apparatus 10 includes a convexly shaped weight member 30 having a relatively pointed leading portion 32 and a relatively broad trailing portion 34. Trailing portion 34 includes a relatively shallow recess, although in alternative embodiments the trailing portion may be flat. An axial opening 36 extends through weight member 30 from leading portion 32 to trailing portion 34.

A plastic tubular element 38 is insertably mounted within axial opening 36. Tubular element 38 includes a highly flexible collapsible segment 40 that extends rearwardly from trailing portion 34. Typically, the entire tubular element 38 comprises a single integral piece. Various types of highly flexible material may be utilized. Preferred materials include the pliable plastic tubing or sheaths that are employed in electrical wiring applications. In any event, for the purposes of this invention it is critical that at least segment 40 comprise a collapsible material, as opposed to the relatively rigid tubing employed in the prior art. Element 38 extends generally to or slightly beyond leading portion 32 of weight member 30. The tubular element slidably accommodates the fishing line and protects that line against fraying and damage from the edges of weight member 30. If the tubular element extends slightly (e.g. 1/32" to ¼") beyond the leading end of the weight member, as indicated by end 33 shown in phantom, line 12 is protected against virtually any angle of hook set, even if the lure and sinker 10 are turned 180 degrees relative to the line 12, as illustrated in phantom. Because element 38 is highly flexible, end 33 "gives" under the stress of the line 12 so that damage to the line is avoided.

Element 38 is preferably dyed, painted or otherwise provided with a surface coloring that is attractive to fish. Red is a preferred color for the tubular element.

A helical element 42 is attached to trailing portion 34 of weight member 30 and extends axially therefrom. Helical element 42 typically comprises a metallic coil spring, although various alternative materials may be utilized. The helical element is attached at an inner end 43 to trailing portion 34 by a suitable waterproof adhesive 34. From inner end 43, helical element 42 is wound approximately 2½ to 3½ turns about tubular element 38 such that the helical element and tubular element extend generally equal distances of not greater than ¼" from trailing portion 34 of weight member 30. Because the helical element does not extend beyond the tubular element, the fishing line is protected by the tubular element from entangling with the helical element. Helical element 42 has a generally uniform diameter and its inner end 43 is spaced apart from and does not touch or engage tubular element 38. The diameter of element 42 is large enough to accommodate eyelet 20 of hook 18 when the hook is set in the manner described below.

Sinker 10 is typically constructed by first forming opening 36 through weight member 30. One end of tubular element 38 is introduced a short distance into opening 36 through trailing portion 34 and a fast-drying waterproof adhesive is deposited on element 38 proximate the entrance of the opening. The tubular element is then inserted fully into opening 36 to the position shown in FIG. 3. This draws the adhesive into the opening where it quickly dries to secure the tubular element in place. Inner end 43 of helical element 42 is then attached by a second distinct application of adhesive directly to the trailing portion 34. Accordingly, the helical element is not secured directly to the tubular element 38.

Figure 4:
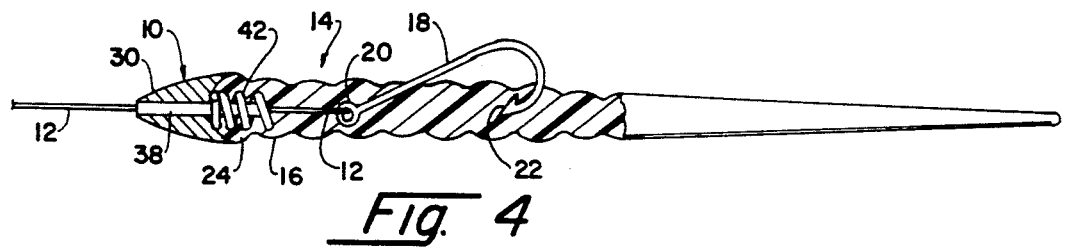
FIG. 4 is an elevational, partly cross-sectional view of a Texas rig equipped with the sinker of this invention.

Sinker 10 is provisionally secured to plastic worm 16 in the manner shown in FIG. 4. In particular, helical element 42 is screwed into head portion 24 of worm 16 so that weight member 30 is attached to and trailing portion 34 engages the head of the worm. Collapsible segment 40 of the tubular element 38 likewise extends into the head portion 24 of worm 16. Fishing line 12, which extends through tubular element 38, is attached to eyelet portion 20 of embedded hook 18 in the manner previously described.

In the condition shown in FIGS. 1 and 4, the lure assembly 14 and the attached sinker 10 are cast by the fisherman. The sinker causes lure assembly 14 to descend reliably to the bottom of the body of water being fished. The fisherman then jigs the assembly 14 in a conventional manner so that fish are attracted.

Figure 5:
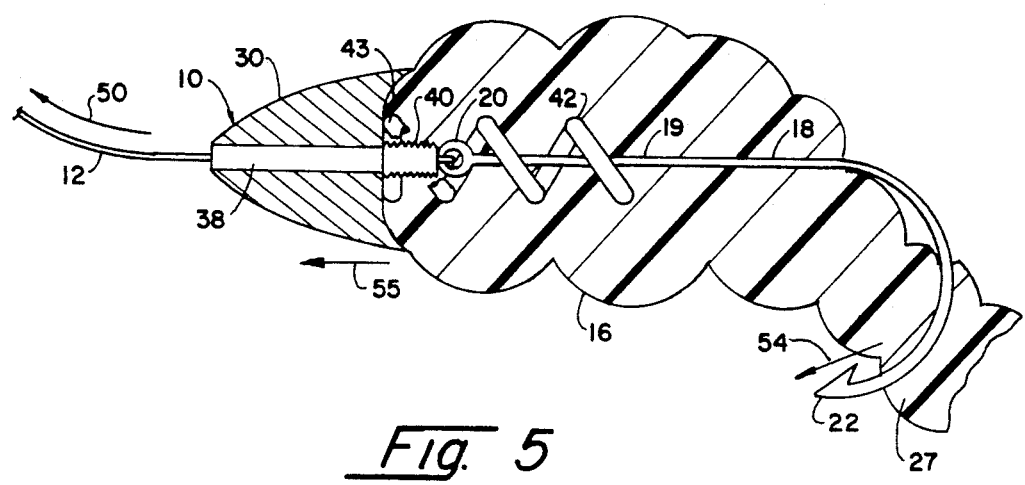
FIG. 5 is an enlarged elevational view, partly in cross-section and partly cut-away, that illustrates the hook being pulled within the helical element to set the hook in a fish that has struck the lure.

When the fisherman senses that a fish has struck the lure, he takes up the slack in line 12 and then jerks the line to set hook 18 in the fish. As shown in FIG. 5, when line 12 is jerked in the direction of arrow 50, eyelet 20 and a portion of shaft 19 of hook 18 are pulled in the direction of arrow 55 within helical element 42. Eyelet 20, which has a larger diameter than tubular element 38, bears against segment 40 and causes it to collapse toward weight member 30. Although segment 40 is illustrated as being longitudinally collapsed in an accordion-like manner, it may also collapse in other ways such as by bending or folding. In any event, eyelet 20 and shaft 19 are pulled within helical element 42 and the hook 18 moves unhindered through worm 16 so that point portion 22 is pulled in the manner indicated by arrow 54 completely through body portion 27 of the worm. As a result, point 22 is able to pierce and engage the fish so that the fish is properly hooked. Unlike the prior art, which employs a relatively rigid tubular element and a relatively narrow diameter helical element that restrict movement of the hook through the body of the worm when the fisherman attempts to set the hook, apparatus 10 does not hinder movement of the hook and allows the hook to be effectively set.

Figure 6:
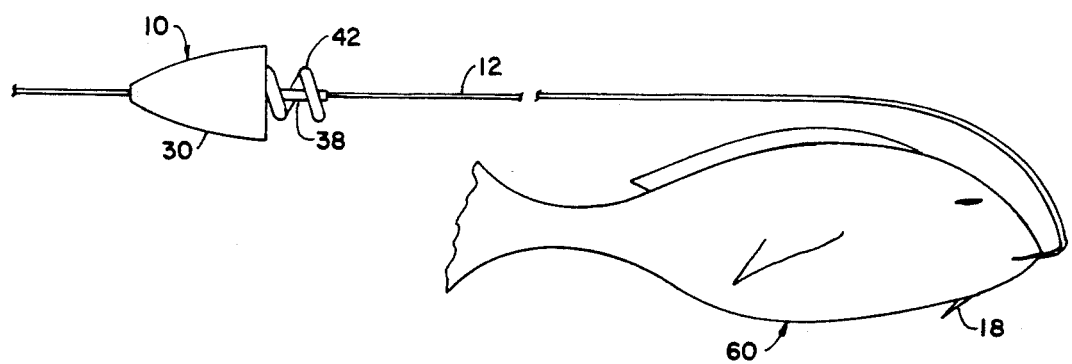
FIG. 6 is an elevational view of the sinker after the hook has been set in a fish that has struck the lure and the sinker has been released and converted to a slip sinker.

As hook 18 is pulled against tubular element 38 in the direction of arrow 55, a force is applied in that direction to weight member 30. Because of the relatively short length of helical element 42, this force causes the entire sinker apparatus 10 to dislodge from head portion 24 of worm 16. Release of sinker apparatus 10 from lure 14 is also facilitated because the helical element 42 has a generally cylindrical shape and a uniform diameter, unlike the conical shape employed by known helical elements. As shown in FIG. 6, apparatus 10 releases to become a slip sinker, which slides along fishing line 12. Hook 18 remains set in fish 60. However, sinker apparatus 10 is disengaged from the lure assembly. As a result, line 12 is less likely to break from the force exerted on it as the fisherman fights and reels in the hooked fish. Additionally, the user is provided with an improved feel, which facilitates landing the fish that has been hooked.

Accordingly, the present invention permits for a fishhook to be set much more effectively and reliably than in prior devices. This is because the device employs a collapsible tubular element and a relatively large diameter helical element rather than a relatively rigid tubular element and small diameter spring as have been heretofore employed. Additionally, the present invention uniquely allows the initially fixed sinker to become a slip sinker after the hook is set. This is permitted because of the relatively short distance of the helical element, as well as the helical element's generally cylindrical shape and uniform diameter. Furthermore, the collapsible tubular element, which preferably extends slightly beyond the leading portion of the sinker, protects the fishing line far more effectively than do devices of the prior art.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A fishing sinker apparatus for a Texas rig type fishing lure assembly, wherein an eyelet portion of a hook at the end of a fishing line is embedded proximate a head of the lure and a pointed portion of the hook is embedded proximate a tail of the lure, said apparatus comprising:

a convexly tapered weight member having a narrow leading portion, a broad trailing portion and an axial opening that extends through said weight member from said leading portion to said trailing portion;

a helical element attached to said trailing portion of said weight member and extending axially a short distance therefrom for provisionally screwing said weight member to said lure; and a tubular element mounted in said axial opening and including a collapsible segment that extends from said trailing portion and through said helical element for slidably receiving said fishing line and protecting said fishing line from said helical element;

said helical element having an inner end that is spaced apart from said tubular element and further having a substantially uniform diameter, and a length such that said eyelet portion of said hook may be pulled within said helical element by said fishing line to collapse said collapsible segment of said tubular element and release said weight member from said lure such that said sinker is slidable along said fishing line.

2. The apparatus of claim 1 in which said helical element and said collapsible segment of said tube extend generally equal distances beyond said trailing portion of said weight member.

3. The apparatus of claim 1 in which said helical element is wound no more than three and a half turns from said trailing portion of said weight member.

4. The apparatus of claim 1 in which said helical element extends no more than $\frac{1}{4}''$ from said trailing portion of said weight member.

5. The apparatus of claim 1 in which said tubular element includes a forward portion that extends slightly beyond said leading end of said weight member.

6. The apparatus of claim 5 in which said forward portion comprises a collapsible material.

7. The apparatus of claim 5 in which said forward portion of said tubular element extends no less than 1/32'' and no greater than $\frac{1}{4}''$ beyond said leading portion of said weight member.

8. The apparatus of claim 1 in which said tubular element includes a fish-attractive surface coloring.

* * * * *